(No Model.)

A. WRIGHT.
SUPPORT FOR ELECTRIC CABLES.

No. 277,528. Patented May 15, 1883.

WITNESSES:
Henry J. Miller
Chas. F. Schmelz

INVENTOR:
Augustus Wright
by Jos. A. Miller & Co.
atty's

UNITED STATES PATENT OFFICE.

AUGUSTUS WRIGHT, OF PROVIDENCE, RHODE ISLAND.

SUPPORT FOR ELECTRIC CABLES.

SPECIFICATION forming part of Letters Patent No. 277,528, dated May 15, 1883.

Application filed May 31, 1882. (No model.)

*To all whom it may concern:*

Be it known that I, AUGUSTUS WRIGHT, of the city and county of Providence, and State of Rhode Island, have invented a new and useful Improvement in Supports for Electric Cables; and I hereby declare that the following is a full, clear, and exact description of the same, reference being had to the accompanying drawings, forming part of this specification.

This invention has reference to an improvement in supports for suspending telegraph, telephone, and other wires or cables used for electrical purposes and for transmitting electrical energy.

The invention consists in the novel construction of a clip and its supporting-hook, by which the cable is suspended, as will be more fully set forth hereinafter.

In supporting cables for telephone, electric lighting, and other purposes a strong and heavy wire is usually supported at long intervals, and the cable is suspended from the wire, so that the wire, which has great tensible strength, may support a cable containing a number of wires made primarily with a view to their conductivity.

The object of this invention is to provide a clip that shall be simple and cheap in construction, that will not injure the covering of the cable or the wires, that can be readily closed around the cable and firmly secured, that can be readily suspended from the rigid wire, and that will exclude all water from the cable within the clip.

Figure 1:
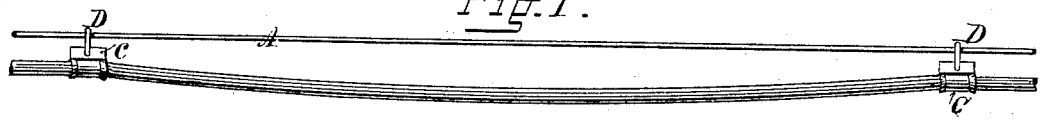
Figure 2:
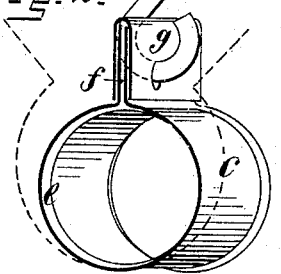
Figure 3:
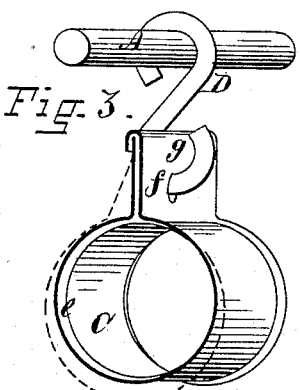
Figure 4:
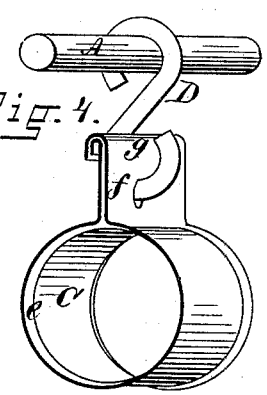
Figure 5:
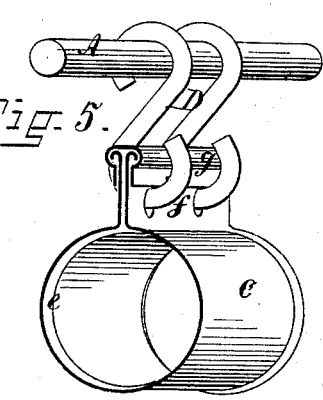
Figure 6:
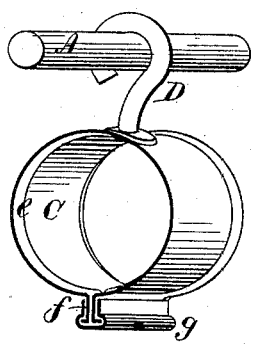
Figure 7:
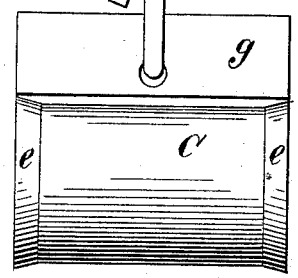

Figure 1 is a view of a cable suspended from a wire. Fig. 2 is a perspective view of one form of my improved clip. The broken lines represent the clip opened to receive the cable. Fig. 3 is a perspective view of a clip in which one edge is made to pass under the overhanging lip of the other edge. Fig. 4 is a perspective view, showing a modification of the clip shown in Fig. 3. Fig. 5 is a perspective view of a clip secured together by a sleeve drawn over the ends of the clip. Fig. 6 is a perspective view of a clip provided with a hook permanently secured, and a sleeve for closing the clip. Fig. 7 is a side view of a clip, showing the flaring ends and the peculiar bent hook by which the same is suspended.

Similar letters of reference indicate corresponding parts in all the figures.

In the drawings, A is the supporting-wire. B is the cable; C, a sheet-metal clip, and D the supporting-hook.

When a cable is suspended it will hang in curves below the supporting-wire, so that the clip is at the highest point. Rain-water will therefore run from the clip toward the center of the loop, and such water will not injure the cable; as the same is exposed to the air and will rapidly dry; but it is important to keep the water from entering between the clip and the cable, and for this purpose I provide the clip C with the flaring ends $e$ by bending the sheet outward, as is shown in the drawings. Now, no matter how suspended, the water from the wire A will run down on the hook D and around the clip C without entering between the clip and cable.

My improved clip is made of sheet metal, preferably covered with any kind of enamel not liable to crack on bending the metal. The metal is bent around an arbor of the thickness of the cable to be inclosed, and the two ends $f$ are bent so as to extend radially from the circular ring. These ends $f\,f$ are secured together by means of a sleeve, $g$, drawn over the same, which in Fig. 2 is a strip of metal bent into U shape and drawn over the ends $f\,f$, a hole being made into the two sides of the sleeve $g$ corresponding with the hole made into the two ends $f\,f$, and through the whole the hook D is passed, which firmly secures the whole together and to the cable and suspends the cable from the wire A. The extreme edge of the ends $f\,f$ may be bent as shown in Figs. 5 and 6, and a sleeve drawn over the same, so as to firmly hold the clip to the cable, and the hook may be secured in any manner desired, either directly to the clip C, as shown in Fig. 6, passing around the clip, or passing through the ends $f\,f$ only, as shown in Fig. 5. The object of the sleeve $g$ is to hold the clip tightly around the cable and cover the joint, so as to prevent the entrance of water between the cable and the clip.

Figs. 3 and 4 represent a method for closing the clip and protecting the joint without the use of the sleeve $g$. It consists in bending the edge of one of the ends $f\,f$ over and inserting the other end under this turned-over edge, thus making one of the ends a cap for the joint, answering to the sleeve g. Various other modifications readily suggest themselves to a practical mind, and I do not wish to confine myself to the specific constructions herein shown for securing the two ends together, as long as this is done by means similar and equivalent to those shown and described, and can be accomplished without screws, rivets, or other similar devices requiring tools to secure the clips and suspend the cable.

When the cable is to be secured to the wire A the hook D must be passed over the wire. When, now, the hook is sufficiently opened to pass over the wire it is also liable to become unhooked. To avoid this I bend the end $d$ sidewise, as is shown in Fig. 7, and leave the loop-opening less than the diameter of the wire, so that when the hook D is slightly turned it will pass over the wire A; but as soon as it is released the wire cannot pass out of the hook. This slight change in form facilitates the securing of the cable greatly, and saves much time and annoyance.

I am aware that telegraph-wires have been suspended from supporting-wires by means of double or S hooks, and that sleeves or collars with flaring ends have been used for many purposes, and I make no claim to such devices, singly applied, for any purpose.

Having thus described my invention, I claim as new and desire to secure by Letters Patent—

1. The herein-described device for supporting telegraph-cables, consisting of a sheet-metal blank bent to form a hollow cylinder, with its ends projecting radially, one or more hooks passing loosely through said projecting ends, and adapted to suspend the clip from a supporting-wire, and means, substantially as described, for connecting said ends together.

2. The combination, with the cylindrical clip C, flaring at its ends, and formed of a sheet-metal strip having its ends $f$ meeting and projecting radially, of the guard-sleeve $g$, embracing said projecting ends, and one or more loosely-connected hooks arranged to suspend the whole from a supporting-wire, substantially as described.

In witness whereof I have hereunto set my hand.

AUGUSTUS WRIGHT.

Witnesses:
M. E. EMERSON,
JOS. A. MILLER.